United States Patent Office 3,366,544
Patented Jan. 30, 1968

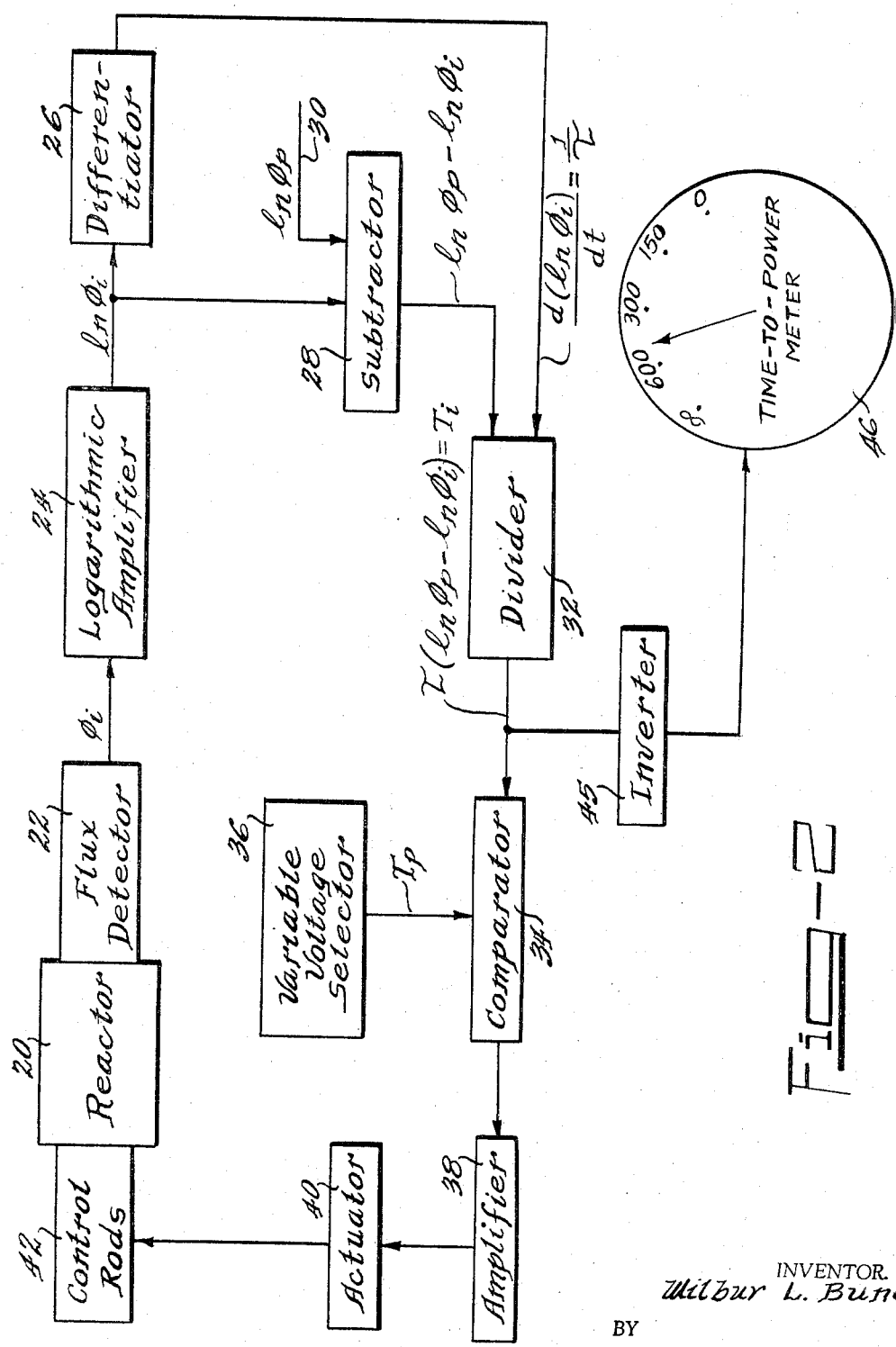

3,366,544
METHOD OF AND APPARATUS FOR CONTROLLING START-UP OF A NUCLEAR REACTOR
Wilbur L. Bunch, Richland, Wash., assignor to the United States of America as represented by the United States Atomic Energy Commission
Filed July 13, 1965, Ser. No. 471,772
6 Claims. (Cl. 176—22)

ABSTRACT OF THE DISCLOSURE

A control system for start-up of a nuclear reactor which continuously adjusts the reactivity of the reactor to maintain the instantaneous quantity $$\frac{K - \ln \phi_i}{\frac{d(\ln \phi_i)}{dt}}$$

wherein $K$ and $\phi_i$ are a predetermined final neutron flux level and the instantaneous neutron flux level, respectively, at a predetermined desired value.

Contractural origin of the invention

The invention described herein was made in the course of, or under, a contract with the United States Atomic Energy Commission.

This invention relates to a method of and apparatus for the control of start-up of a nuclear reactor. More particularly, this invention relates to a method of and apparatus for controlling start-up of a nuclear reactor by measuring the instantaneous neutron flux level of the reactor and providing for the continuous adjustment of the reactivity of the reactor according to a predetermined-safe relationship between instantaneous flux, reactor period, and the desired final flux.

There are numerous ways in which to provide for control of start-up of a nuclear reactor. The most elementary way to provide for control during start-up is to require that the period be a constant up to a flux range near the final flux level and then to increase the period to infinity to maintain a constant final flux level.

The main disadvantage of this method is that the minimum safe reactor period is determined during the time just before the period begins to increase. At a lower flux level, a much shorter period could be safely used, thereby saving considerable time during start-up.

A slightly more sophisticated method of controlling reactor dynamics during start-up is to maintain a relatively short but constant period until the flux level reaches the power range and then to provide flux level information feedback to constantly increase the reactor period. In this scheme, the reactor period information would control the reactor period up to the power range.

Another method for controlling reactor operation during start-up is to insert a computer in the control loop and control the reactor period as a function of time by means of the computer which may be programmed from empirical information or theoretical calculations obtained from the reactor design.

This, of course, is very expensive and takes control completely out of the hands of the operator which is not always desirable, as will be explained below. Another disadvantage to this method is that control of reactor period during start-up as a function of time alone is not desirable for re-starts, in which case the residual flux level is determined by many variables. That is, for safety reasons, it is better to control reactor period as a function of the existing flux level rather than time alone.

Another method of reactor start-up is the "magic number" system as explained in "Control of Nuclear Reactor and Power Plants" by Schultz, McGraw-Hill (1955), pages 241 and 242. This system combines period and level information during reactor start-up in a manner wherein the reactor operates on a constant period up to the power operating range at which time flux level information is detected and used to continuously increase the period as the flux approaches final flux. This system, however, does not allow for discrete operating curves and final flux settings independent of one another. An operating curve, as used here, means the relation between instantaneous flux and period which describes reactor operation during start-up. Once the system constants have been determined for the magic number system, one cannot change the period demand signal without also affecting the final flux level.

It is therefore the main object of the present invention to provide a method for controlling start-up of a nuclear reactor by continuously adjusting reactivity from the very lowest flux range into the power range according to a predetermined safe relationship between instantaneous flux, reactor period, and the desired final flux.

Another object of the invention is to provide a method of start-up of a reactor into the power range which allows operation on very short periods while the flux level is very low and automatically and continuously increases reactor period at higher flux levels into the power range thereby greatly reducing total start-up time.

It is yet another object of this invention to provide improved apparatus for feedback control of reactivity of a reactor into the power range as a function of the instantaneous flux level, reactor period, and the desired final flux level.

It is a further object of this invention to provide improved feedback control apparatus for the start-up of a nuclear reactor which allows for independent settings of final flux and operating curve.

It is a still further object of this invention to provide a system for nuclear reactor start-up wherein, upon a manual take-over and operating during start-up, a signal actuates a display to give the operator a visual indication of the particular operating curve on which the reactor is functioning.

It is an even further object of this invention to provide improved apparatus for a reactor scram signal wherein the scram signal is determined by whether a given instantaneous period at a corresponding flux level is safe.

A still further object of the invention is to provide a method of start-up of a nuclear reactor into the power range which automatically maintains the relationship between the instantaneous flux level and the instantaneous period such that the time required to reach a predetermined desired flux level is a constant.

A still further object of the invention is to provide a method of start-up of a reactor wherein a signal representing the actual time required to reach a predetermined desired flux level is a constant.

A still further object of the invention is to provide a method of start-up of a reactor wherein a signal representing the actual time required to reach a predetermined desired flux level for the existing values of instantaneous flux and instantaneous period is continuously computed and employed as the principal control parameter.

The present invention can best be described in the context of a feedback or servo control system for the start-up of a nuclear reactor. The desired final flux level having been determined, the present system operates on information indicating instantaneous flux and instantaneous period to derive a value for the actual time that would elapse before attaining final flux if the period were to remain unchanged from the instant value. This is called the time-to-power, and is defined by the relationship.

$$T_i = \tau \ln \frac{\phi_p}{\phi_i} \quad (1)$$

where $T_i$ is time-to-power $\tau$ is reactor period $= \dfrac{1}{\dfrac{d(\ln \phi_i)}{dt}}$ $\phi$ is a predetermined desired final flux $\phi_i$ is instantaneous flux.

It will be noted that in order to maintain a constant time-to-power, the reactor period must approach infinity as the instantaneous flux approaches final flux. In other words, a constant time-to-power defines an operating curve in the $\tau$, $\ln \phi_i$ plane which is hyperbolic.

The actual time-to-power signal is compared with a desired time-to-power signal that has been set at a predetermined minimum safe value and the difference signal resulting therefrom is used to control the reactor period. As the flux level increases toward the power range, the control system, operated by the difference signal, will continuously increase the reactor period according to the operating curve defined by the choice of a safe time-to-power. In this way, start-up time is minimized by allowing the shortest periods consistent with safety at the lowest flux levels and requiring longer periods at higher flux levels as safety requires.

The time-to-power signal also readily lends itself to meter display in case of manual take-over or operation of the start-up procedure. This meter display, in connection with flux level information, allows an operator to more easily comprehend conditions existing within the reactor than does the present method of displaying period and level information.

Further, this signal has very desirable characteristics as a scram signal. That is, an excursion beyond a predetermined operating curve will be sensed and an alarm indicated or automatic action taken to shut down the reactor. Since each operating curve is a constant time-to-power, it may easily be compared with a constant representative of a predetermined minimum safe time-to-power to indicate the existence of hazardous conditions.

Further it is apparent that this time-to-power signal is the most relevant of all possible control or scram signals since it is the only one which can be directly related to the actual time required to actuate a scram relay and physically move the safety rods into the reactor.

Further understanding of the nature and objects of the present invention may better be understood by reference to the following description together with the accompanying drawings in which:

FIGURE 2 is a schematic representation of a specific embodiment for the practice of the invention as a servo control system.

It has been shown that under a condition of positive reactivity of the neutron flux ($\phi$) in a nuclear reactor increases exponentially with time according to the Equation 2 below:

$$\phi = \phi_0 \epsilon^{t/\tau} \quad (2)$$

where $\phi_0$ is the initial flux density, $t$ is time, $\epsilon$ is the base of the natural logarithm, and $\tau$ is the reactor period (that is, the time required for the flux level to increase by a factor of $\epsilon$). See, Introduction to Nuclear Engineering, Stephenson, McGraw-Hill Book Company, Inc. (1954), page 265, for a more complete analysis.

Taking the logarithm of both sides of Equation 2 and differentiating with respect to time:

$$\frac{d(\ln \phi)}{dt} = \frac{1}{\tau} \quad (3)$$

Equation 3 indicates that if the logarithm of the flux level in a reactor is measured and then differentiated with respect to time, result is inversely proportional to the reactor period.

If we then define a quantity, herein called time-to-power and designated $T_i$, as the time required to reach a desired flux level ($\phi_p$) from the existing flux level ($\phi_i$) with a constant period ($\tau$), we get the following relationship by taking the logarithm of each side of Equation 2:

$$T_i = \tau(\ln \phi_p - \ln \phi_i) = \tau \ln \frac{\phi_p}{\phi_i} \quad (4)$$

Figure 1:
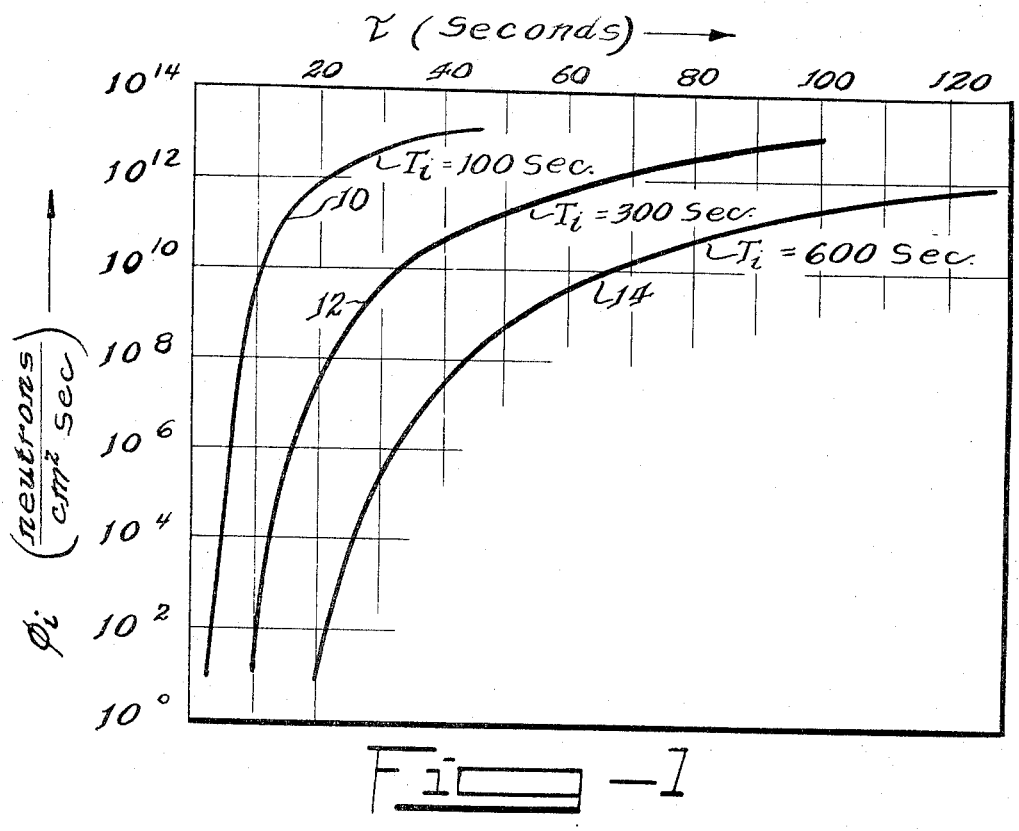
FIGURE 1 is a plot of the natural logarithm of flux level as a function of reactor period for a family of operating curves defined by constant times-to-power.

FIGURE 1 is a graph in which reactor period ($\tau$) in seconds is the abscissa and the instantaneous flux level ($\phi_i$) in neutrons per square centimeter per second on a logarithmic scale is the ordinate. Time-to-power ($T_i$), according to Equation 4, defines independent operating curves in this graph as shown by reference numerals 10, 12, and 14. An operating curve, as mentioned before, uniquely defines a relationship between instantaneous flux and reactor period. Operating curve 10 in FIGURE 1 shows the relationship between instantaneous flux and reactor period for a constant time-to-power of 100 seconds. Operating curves 12 and 14, respectively, show the same relationship for times-to-power of 300 and 600 seconds. As FIGURE 1 indicates, if time-to-power is used as a control parameter for start-up of a nuclear reactor, the start-up operation can be made very efficient since the concept inherently makes use of the shortest period consistent with safety at all flux levels. Since desired time-to-power is a constant in my system, it may be represented in a control system by a DC voltage level and this makes comparison with a computed actual or instantaneous time-to-power relatively simple.

It should be noted here that the time-to-power concept makes use of the fact that for a given time-to-power there is a unique period for each flux level. This means that once a safe region for reactor start-up has been defined in terms of the actual time required to shut down the reactor under scram conditions, a single time-to-power curve or a series of time-to-power curves can be fitted to the safe operating areas.

FIGURE 2 shows a nuclear reactor 20 with a flux level detector 22. A logarithmic amplifier 24 is connected to the output of the flux detector 22 and feeds a differentiator 26 and a subtractor circuit 28. The subtractor circuit 28 has another input 30 which is a constant corresponding to the logarithm of a predetermined desired final flux level. The output of the subtractor circuit 28 acts as one input to a divider 32; the other input to the divider 32 is the output of the differentiator 26. The divider 32 then feeds a comparator 34. A second comparator input 34 is the output of a variable voltage selector 36 indicating a predetermined desired time-to-power ($T_p$). The comparator output, constituting a servo error signal, is then connected to an amplifier 38 which in turn is connected to an actuator circuit 40. The actuator circuit 40 energizes control rods 42 which adjust the reactivity of the reactor 20 in such a manner as to tend to maintain the error signal at a zero value. If desired, the output of the divider circuit 32 may feed an inverter 45 which may be employed to energize a time-to-power meter 46 for information purposes or for manual control of the reactor.

Still referring to FIGURE 2, the flux detector 22 senses the neutron flux in the reactor 20 and generates an output voltage proportional to the instantaneous flux ($\phi_i$). The output of the logarithmic amplifier 24 is then a voltage corresponding to the natural logarithm of $\phi_i$. The differentiator 26 differentiates the $\ln \phi_i$ signal, and its output voltage is representative of the reciprocal of the reactor period $1/\tau$ as described in Equation 3 and the accompanying text. The output of the logarithmic amplifier 24 also serves as an input to the subtractor 28. The other input 30 to the subtractor 28 is a DC voltage setting corresponding to the natural logarithm of the desired final flux (ln $\phi_p$). The output voltage of the subtractor 28 represents the difference between the logarithm of the desired final flux and the logarithm of the instantaneous flux. This voltage will always be positive since the instantaneous flux will never exceed the desired final flux during start-up. The output voltage of the divider 32 corresponds to the computed value of the actual time-to-power ($T_i$) as described by Equation 4. The comparator 34 determines the servo error signal, that is, the difference between the voltage corresponding to a desired time-to-power ($T_p$) and the actual computed time-to-power ($T_i$). The output of the comparator 34 is then amplified by the amplifier 38 which energizes the actuator 40 which controls the motion of the rods 42 to control the reactivity of the reactor 20.

Since the output of the divider 32 is a voltage representative of the actual time-to-power, it may be displayed directly on a meter, but for purposes of meter display, it is better to use a signal which is inversely proportional to the time-to-power signal. FIGURE 2 shows the output of the divider 32 feeding an inverter 45 which drives a meter 46. The reason for this is that as the flux level approaches the desired level, the voltage representing the quantity $$\frac{d(\ln \phi_i)}{dt}$$

approaches zero and since this quantity is divided into the output of the subtractor 28 on FIGURE 2, the output of the divider 32 will become large and inaccurate. By using a signal inversely proportional to $T_i$, the rest position of the meter would correspond to an infinite time-to-power. The meter 46 therefore shows a reversed scale for a clockwise meter movement. Although only one scale is shown on the meter 46, it obviously would be desirable to have a meter with more than one scale so that during manual operation, for instance, the operator would be able to select a scale for which the desired time-to-power would show a mid-scale reading. In a manual control system, the operator would continuously position the control rods so as to maintain the time-to-power displayed on the meter at its constant desired value.

Figure 3:
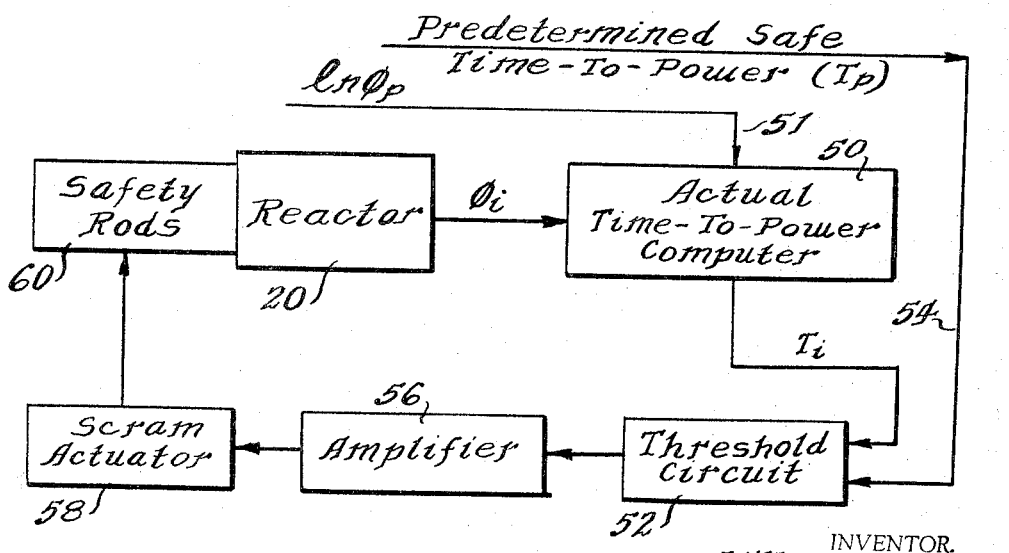
FIGURE 3 is a schematic representation of a specific embodiment for the practice of the invention as a scram system for a nuclear reactor.

FIGURE 3 shows a schematic representation of a specific embodiment of a scram system for a nuclear reactor employing the time-to-power concept. An actual time-to-power computer 50 operates on a measurement of the instantaneous neutron flux in a reactor 20. Another input 51 to the time-to-power computer 50 is a constant signal representative of the logarithm of the desired final flux (ln $\phi_p$). The output of the time-to-power computer 50 serves as one input to a threshold circuit 52. The other input to the threshold circuit is a predetermined safe time-to-power 54. The output of the threshold circuit 52 is fed into an amplifier 56 which in turn feeds a scram actuator 58. The scram actuator energizes safety rods 60.

The instantaneous flux ($\phi_i$) of the reactor 20 may be sensed by a neutron detector as described above. The time-to-power computer 50 generates a voltage proportional to the actual time-to-power ($T_i$) of the reactor 20 in a manner similar to that described in connection with FIGURE 2. The input 54 to the threshold circuit 52 is a constant voltage representative of the predetermined safe time-to-power ($T_p$). This voltage defines an operating curve as described in connection with FIGURE 1. The threshold circuit 52 senses a condition wherein the actual time-to-power ($T_i$) is less than the predetermined safe time-to-power ($T_p$) and generates an alarm signal when such a condition occurs. The alarm signal is amplified in amplifier 56 and energizes the scram actuator 58 which acts to rapidly introduce poison to shut down the reactor 20 by injecting safety rods 60.

Persons skilled in the art will, of course, readily adapt the teachings of the present invention to embodiments far different than the embodiment illustrated. Accordingly, the scope of the protection afforded the invention should not be limited to the particular embodiment shown in the drawings and described above but shall be determined only in accordance with the appended claims.

The embodiments of the invention in which an exclusive property or privilege is claimed are defined as follows:

1. In a nuclear reactor servo control start-up system of the type wherein a desired final flux level representing a desired final power level is attained by continuous adjustment of control elements in response to an error signal, so as to tend to maintain said error signal at a zero value, the combination comprising:
   (1) means for obtaining a signal corresponding to the instantaneous flux level of said reactor ($\phi_i$);
   (2) means responsive to said first-named means for deriving an actual instantaneous time-to-power signal ($T_i$) equal to $$\frac{K - \ln \phi_i}{\frac{d(\ln \phi_i)}{dt}}$$

wherein K is a predetermined constant corresponding to the desired final flux level;
   (3) means for setting a predetermined desired safe time-to-power signal; and
   (4) subtracting means for comparing said actual instantaneous time-to-power signal and said desired time-to-power signal to obtain the said error signal.

2. Apparatus for sensing a hazardous condition during start-up of a nuclear reactor, the instantaneous power level of which is determined by its instantaneous neutron flux level, and providing for a scram shut-down in response thereto comprising:
   (1) means for obtaining a signal corresponding to the instantaneous flux level of said reactor ($\phi_i$);
   (2) means responsive to said first-named means for deriving an actual instantaneous time-to-power signal ($T_i$) equal to $$\frac{K - \ln \phi_i}{\frac{d(\ln \phi_i)}{dt}}$$

wherein K is a predetermined constant corresponding to the desired final flux level;
   (3) means for setting a predetermined minimum safe constant signal of a quantity ($T_p$);
   (4) means for comparing said actual time-to-power signal ($T_i$) and said predetermined minimum safe signal ($T_p$) and producing an output signal responsive to a condition wherein the latter exceeds the former; and
   (5) means responsive to the output signal of said camparing means for rapidly introducing poison into said reactor when said output signal is present.

3. Apparatus for visual display of operating conditions existing within a nuclear reactor, the instantaneous power level of which is determined by its instantaneous neutron flux level, during start-up comprising:
   (1) means for obtaining a signal corresponding to the instantaneous flux level of said reactor ($\phi_i$);
   (2) means responsive to said first-named means for deriving an inverted instantaneous time-to-power signal equal to $$\frac{\frac{d(\ln \phi_i)}{dt}}{K - \ln \phi_i}$$

wherein K is a predetermined constant corresponding to the desired final flux level; and (3) a meter adapted to be linearly responsive to said inverted time-to-power signal and having an inverted logarithmic scale indicating actual times-to-power whereby the rest position of said meter represents an infinite time-to-power corresponding to a zero value for $$\frac{d(\ln \phi_i)}{dt}$$

4. A method of start-up of a nuclear reactor, the instantaneous power level of which is determined by its instantaneous neutron flux level, including a reactor control rod comprising the steps:
   (1) converting the instantaneous neutron flux level of said reactor ($\phi_i$) into a first electrical signal proportional thereto;
   (2) converting said first electrical signal into a second electrical signal ($T_i$) proportional to $$\frac{K - \ln \phi_i}{\frac{d(\ln \phi_i)}{dt}}$$

wherein K is a predetermined constant representative of a desired final neutron flux level; and
   (3) continuously adjusting the position of said reactor control rod to maintain said second electrical signal ($T_i$) at a predetermined value.

5. A method of start-up of a nuclear reactor, the instantaneous power level of which is determined by its instantaneous neutron flux level, including a reactor control rod comprising the steps:
   (1) converting the instantaneous neutron flux level of said reactor ($\phi_i$) into a first electrical signal proportional thereto;
   (2) converting said first electrical signal into a second electrical signal ($T_i$) proportional to $$\frac{K - \ln \phi_i}{\frac{d(\ln \phi_i)}{dt}}$$

wherein K is a predetermined constant representative of a desired final neutron flux level;
   (3) generating a third electrical signal proportional to a predetermined desired value of a quantity ($T_p$); and
   (4) continuously adjusting the position of said reactor control rod to maintain equality between said second and third electrical signals.

6. The method of sensing hazardous conditions during start-up of a nuclear reactor, the instantaneous power level of which is determined by its instantaneous neutron flux level, and providing for a scram shut-down in response thereto comprising the steps:
   (1) converting the instantaneous neutron flux level of said reactor ($\phi_i$) into a first electrical signal proportional thereto;
   (2) converting said first electrical signal into a second electrical signal ($T_i$) proportional to $$\frac{K - \ln \phi_i}{\frac{d(\ln \phi_i)}{dt}}$$

wherein K is a predetermined constant representative of a desired final neutron flux level;
   (3) generating a third electrical signal proportional to a predetermined minimum safe constant value of the quantity ($T_p$); and
   (4) rapidly introducing poison, thereby shutting down said reactor whenever the value of said third electrical signal exceeds the value of said second electrical signal.

References Cited

Schultz: Control of Nuclear Reactors and Power Plants, 1955, p. 241.

Nuclear Engineering Handbook, 1958, pp. 8–30, Sec. 1.64.

CARL D. QUADFORTH, *Primary Examiner.*

L. DEWAYNE RUTLEDGE, BENJAMIN R. PADGETT, *Examiners.*

H. E. BEHREND, *Assistant Examiner.*